United States Patent
Yoshida et al.

(10) Patent No.: US 7,054,132 B2
(45) Date of Patent: May 30, 2006

(54) VARIABLE CAPACITANCE ELEMENT

(75) Inventors: Koichi Yoshida, Yokohama (JP);
Takahiro Oguchi, Shiga-ken (JP);
Yoshihiro Konaka, Sagamihara (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/535,861

(22) PCT Filed: Jul. 7, 2004

(86) PCT No.: PCT/JP2004/009642

§ 371 (c)(1),
(2), (4) Date: May 20, 2005

(87) PCT Pub. No.: WO2005/027257

PCT Pub. Date: Mar. 24, 2005

(65) Prior Publication Data

US 2006/0056132 A1  Mar. 16, 2006

(30) Foreign Application Priority Data

Sep. 8, 2003  (JP) .............................. 2003-315423

(51) Int. Cl.
*H01G 5/00* (2006.01)

(52) U.S. Cl. ................... 361/277; 361/278; 361/298.3; 361/299.5; 333/185

(58) Field of Classification Search ................ 361/277, 361/278, 280–282, 290, 299.2, 299.5, 298.3; 333/182–186

See application file for complete search history.

(56) References Cited

U.S. PATENT DOCUMENTS

| | | | |
|---|---|---|---|
| 5,479,042 A | 12/1995 | James et al. | |
| 5,526,172 A | 6/1996 | Kanack | |
| 5,901,031 A * | 5/1999 | Ishige et al. | 361/277 |
| 6,020,564 A | 2/2000 | Wang et al. | |
| 6,133,807 A | 10/2000 | Akiyama et al. | |
| 6,242,989 B1 | 6/2001 | Barber et al. | |
| 6,813,135 B1 * | 11/2004 | Nakamura et al. | 361/277 |
| 6,833,985 B1 * | 12/2004 | Fujii et al. | 361/281 |

FOREIGN PATENT DOCUMENTS

| | | |
|---|---|---|
| JP | 08-21967 | 1/1996 |
| JP | 08-509093 | 9/1996 |
| JP | 11-274805 | 10/1999 |
| JP | 2000-100659 | 4/2000 |
| JP | 2000-188050 | 7/2000 |

* cited by examiner

OTHER PUBLICATIONS

Offical Communication issued on Aug. 16, 2005, by the European Patent Office In the corresponding European Application No. 04747111.5.

*Primary Examiner*—Anthony Dinkins
(74) *Attorney, Agent, or Firm*—Keating & Bennett, LLP

(57) ABSTRACT

A variable capacitance element includes a movable element provided above a substrate using supporting portions and support beams so as to be displaced from the substrate. An insulating film and a movable electrode are provided on a conductor facing surface of the movable element. A driving electrode is arranged to displace the movable element, between a signal cutoff position and a signal passage position, whereby a high frequency signal transmitted through a transmission line is cut off or allowed to pass. The insulating film uses compressive stress to warp the movable element and the movable electrode in a direction of warping in a convex form toward the transmission line, and maintains this warping direction.

20 Claims, 15 Drawing Sheets

VARIABLE CAPACITANCE ELEMENT

BACKGROUND OF THE INVENTION

1. Field of the Invention

The present invention relates to a variable capacitance element that performs a switching operation on a high frequency signal by changing capacitance, and also relates to a variable capacitance element used as a variable capacitor.

2. Description of the Related Art

In general, variable capacitance elements are used as, for example, variable capacitance switches, variable capacitors, and other suitable devices. In a variable capacitance element such as, for example, the electrostatically driven switch described in Japanese Unexamined Patent Application Publication No. 2000-188050, a movable element is provided above a substrate so as to be spaced therefrom, and the movable element is moved closer to or farther away from the substrate by an electrostatic force.

In the variable capacitance switch disclosed in Japanese Unexamined Patent Application Publication No. 2000-188050, a transmission line, such as a coplanar line, is provided above a substrate. A plate-like movable element is disposed above the substrate by support beams so as to be displaceable. The movable element opposes an intermediate region of the transmission line, with a gap provided therebetween.

A region of the movable element which faces the transmission line is provided with a movable electrode defined by a metal film or other suitable structure. The movable electrode and the movable element are displaced perpendicularly relative to the substrate, whereby both are moved closer to or farther away from the transmission line.

The movable element is provided with a driving electrode which is externally supplied with power. For example, the substrate is also provided with a counter driving electrode which opposes the driving electrode, with a gap provided therebetween. When power is supplied between the driving electrodes, an electrostatic force is generated therebetween, whereby the movable element is displaced in a predetermined direction (e.g., a direction toward the transmission line) against the spring forces of the support beams. This displaces the movable electrode together with the movable element, and the gap (or capacitance) between the movable electrode and the transmission line changes.

When power supplied to the driving electrodes is stopped, the movable element and the movable electrode are returned to their initial positions by the spring forces of the support beams. This returns the capacitance between the movable electrode and the transmission line to an initial state.

As described above, in a variable capacitance switch, by increasing and decreasing the capacitance between a movable electrode and a transmission line in accordance with the position of a movable element, and changing the resonant frequency of the transmission line in this region, for example, a high frequency signal transmitted through the transmission line is permitted to pass or is cut off (or reflected) at a variable capacitance switch position.

In the above-described related art, for example, a plate-like movable element is moved closer to and farther away from a transmission line. However, when the movable element is displaced, for example, due to the shapes of support beams or a variation in spring force, the movable element (and movable electrode) may be moved close to the transmission line in an inclined orientation and not parallel thereto.

Accordingly, when the movable electrode is moved close to the transmission line, the size of a gap (or capacitance) between the movable electrode and the transmission line varies due to the inclined orientation. This causes a possibility that the resonant frequency of the transmission line and the transmission characteristics of a high frequency signal are unstable, such that a problem occurs in that the performance and reliability required for a switch deteriorate.

In a variable capacitance switch of the related art, a film movable electrode is provided so as to cover a plate-like movable element. Accordingly, when an ambient temperature around the switch changes, the movable element and the movable electrode easily warp due to a difference in thermal expansion between both. Moreover, regarding the warping, there are, for example, cases in which the movable element warps in a convex form toward the transmission line, and in which the movable element warps in a concave form away from the transmission line. The warping direction may be changed in accordance with an increase or decrease in temperature.

Accordingly, in the related art, depending on the warping state (warping direction and degree) of the movable element, the capacitance between the movable electrode and the transmission line easily varies. Thus, this causes a problem in that the operation of the variable capacitance switch becomes unstable due to a change in temperature.

SUMMARY OF THE INVENTION

To overcome the problems described above, preferred embodiments of the present invention provide a variable capacitance element in which, when a movable element is displaced, capacitance can be stably changed between a movable electrode and a fixed electrode, which maintains outstanding operation characteristics with changes in temperature, and in which reliability is greatly improved.

To overcome the problems described above, preferred embodiments of the present invention provide a variable capacitance element including a substrate, a fixed electrode provided on the substrate, a plate-like movable element provided on the substrate at a position opposing the fixed electrode so as to be displaced, the movable element being moved close to and away from the fixed electrode, a movable electrode provided in a region of the movable element which faces the fixed electrode, the movable electrode having a capacitance in conjunction with the fixed electrode which is changed when the movable electrode is moved close to or away from the fixed electrode, and a driver for driving the movable element in a direction in which the movable element is moved close to or away from the fixed electrode, wherein the movable element is provided with a warp adjusting film by which a direction in which a central portion of the movable element warps with respect to peripheral portions thereof is constantly maintained in one of a direction of warping in a convex form toward the fixed electrode and a direction of warping in a concave form away from the fixed electrode.

According to a preferred embodiment of the present invention, the movable element is provided with a warp adjusting film by which a direction in which a central portion of the movable element warps with respect to peripheral portions thereof is constantly maintained in one of a direction of warping in a convex form toward the fixed electrode and a direction of warping in a concave form away from the fixed electrode.

Since a movable element is provided with a warp adjusting film, a driver is used to move the movable element close to and away from a fixed electrode. At this time, the capacitance between the movable electrode and the fixed electrode can be changed. In this case, for example, for a change in temperature, the warp adjusting film allows the movable element to constantly warp in a predetermined direction. When the movable element is displaced close to the fixed electrode, the warp adjusting film stably maintains the movable electrode at a predetermined position close to the fixed electrode.

Accordingly, for example, even if the movable element is inclined to some extent and is moved close to the fixed electrode, in its central region, the movable electrode and the fixed electrode can be moved close to each other with an accurate positional relationship. For example, even if the temperature of the element greatly changes, the warp adjusting film prevents the movable element and the movable electrode from having a change in warp due to a difference in thermal expansion, and prevents the positional relationship between the movable electrode and the fixed electrode from being shifted due to the changes in temperature.

Therefore, a capacitance obtained when the movable electrode and the fixed electrode are moved close to each other can be set to an accurate value. The capacitance therebetween can be switched with high accuracy in accordance with the position of the movable element. This makes it possible to perform stable switching operations of various types which use, for example, a change in capacitance, and good operation characteristics can be maintained for a change in temperature. In addition, the performance and reliability of the element is greatly improved.

When the sum of an internal stress generated in the formation of the warp adjusting film on the movable element and a thermal stress generated by a difference in thermal expansion between the movable element and the warp adjusting film is a total stress, the movable element and the warp adjusting film may be formed such that, for a change in temperature, the total stress constantly maintains the warping of the movable element in the same direction.

In this case, the movable element and the warp adjusting film are formed so that a total stress of an internal stress and a thermal stress constantly maintains the warping of the movable element in the same direction. Thus, even if the temperature of the element changes in a broad temperature range, it is ensured that, after the total stress which is applied to the movable element and the warp adjusting film greatly changes due to an increase or decrease in temperature, the warping direction is prevented from being varied based on this stress. Accordingly, the movable element can be constantly warped in a predetermined direction in a stable state.

Preferably, the warp adjusting film is arranged to warp the movable element in the direction of warping in the convex form toward the fixed electrode.

The warp adjusting film is arranged such that the movable element warps in a convex form toward the fixed electrode. Thus, a central portion of the movable element projects close to the fixed electrode as compared to peripheral portions. This permits the central portion of the movable element and the fixed electrode to move closer to each other, even if the movable element is displaced toward the fixed electrode at an incline. Thus, the distance therebetween is sufficiently reduced.

Therefore, when the movable element is moved close to or away from the fixed electrode, the capacitance between both can be greatly changed. This makes it possible to perform stable switching operations of various types in accordance with a change in capacitance.

In addition, the warp adjusting film may be an insulating film for covering, with a compressive stress, the region of the movable element which faces the fixed electrode, the movable electrode may be provided on the movable element, with the insulating film provided therebetween, and the insulating film may use the compressive stress to warp the movable element and the movable electrode in the direction of warping in the convex form toward the fixed electrode.

According to a preferred embodiment of the present invention, the movable electrode is provided on the movable element, with the insulating film provided therebetween, which defines a warp adjusting film, and the insulating film uses a compressive stress to warp the movable element and the movable electrode in the direction of warping in a convex form toward the fixed electrode. Thus, when the movable element reaches the vicinity of the fixed electrode, the distance between the central portion of the movable electrode and the fixed electrode is sufficiently reduced. This makes it possible to perform stable switching operations of various types by greatly changing the capacitance between the movable electrode and the fixed electrode.

Since the insulating film provides insulation between the movable element and the movable electrode, for example, even if the movable element is supplied with power, the need to provide another insulating structure between the movable element and the movable electrode is eliminated.

The warp adjusting film may be arranged so as to warp the movable element in the direction of warping in the concave form away from the fixed electrode.

In this case, the warp adjusting film is arranged so as to warp the movable element in the direction of warping in the concave form away from the fixed electrode. Thus, the movable electrode and the fixed electrode can be moved close to each other, having an accurate positional relationship, for example, even if there is inclination of the movable element or a change in ambient temperature. Accordingly, the capacitance therebetween can be switched with high accuracy in accordance with the position of the movable element.

In addition, according to a preferred embodiment of the present invention, between the fixed electrode and the movable electrode, preferably, at least one member is provided with an insulating stopper which abuts on the other member when the movable element is displaced toward the fixed electrode.

According to another preferred embodiment of the present invention, between the fixed electrode and the movable electrode, at least one member is provided with an insulating stopper which abuts against the other member when the movable element is displaced toward the fixed electrode. Thus, for example, in a case in which the fixed electrode is provided with a stopper, when the movable element is displaced toward the fixed electrode, the movable electrode abuts against the stopper.

This enables the stopper to stably maintain the movable element at a predetermined position close to the fixed electrode, such that the positional relationship (capacitance) between the movable element and the fixed electrode is accurately set. The movable electrode is prevented from being accidentally displaced due to a shock or other force, thus enhancing resistance of the element to vibration. The stopper provides insulation between the movable electrode and the fixed electrode, such that short-circuiting is prevented.

In addition, for example, where the movable electrode is provided with a stopper, when the movable element is displaced toward the fixed electrode, the stopper abuts against the fixed electrode. In addition, the positional relationship between the movable electrode and the fixed electrode is accurately set by the stopper, and short-circuiting is prevented.

According to a preferred embodiment of the present invention, the stopper is provided in a region in which the fixed electrode and the movable electrode oppose each other.

Thus, when the movable element reaches a position close to the fixed electrode, an area in which the movable electrode and the stopper abut against each other (or an area in which the fixed electrode and the stopper abut against each other) is reduced. This prevents the variable capacitance element from malfunctioning due to fixed bonding of the movable electrode and the stopper, or the fixed electrode and the stopper, such that the element operation is stabilized.

At locations other than where the stopper is provided, a gap is formed between the movable electrode and the fixed electrode. Thus, even if the movable electrode or the fixed electrode has, at the gap location, a projection due to a processing error, the projection is prevented from affecting the positional relationship between the movable electrode and the fixed electrode. Accordingly, the stopper absorbs a processing error in the movable electrode or the fixed electrode, such that the positional relationship thereof can be stably set.

The fixed electrode is preferably defined by a transmission line for transmitting a high frequency signal.

Thus, when the movable element and the movable electrode are disposed close to or away from the transmission line, a high frequency signal transmitted through the transmission line can be cut off or allowed to pass, whereby a switching operation is performed for the high frequency signal.

Since, in this case, even if there is an inclination of the movable element or a change in ambient temperature, the warp adjusting film maintains the warping of the movable element to be unidirectional, a capacitance that is obtained when the movable electrode and the fixed electrode are close to each other can be accurately set to a desired value. The resonant frequency of the transmission line can be switched to a desired value. This makes it possible to perform a stable switching operation between passage and cutoff of the high frequency signal.

According to a preferred embodiment of the present invention, a different substrate is preferably provided opposite to the substrate, with the movable element provided therebetween. The different substrate is provided with a driving electrode which defines the driver and which uses an electrostatic force to displace the movable element.

Thus, by generating an electrostatic force between the driving electrode and the movable element, the movable element can be stably moved close to and away from the fixed electrode.

Other features, elements, steps, characteristics and advantages of the present invention will become more apparent from the following detailed description of preferred embodiments thereof with reference to the attached drawings.

BRIEF DESCRIPTION OF THE DRAWIGS

DETAILED DESCRIPTION OF PREFERRED EMBODIMENTS

Variable capacitance elements according to preferred embodiments of the present invention are described below in detail with reference to the accompanying drawings.

FIGS. 1 to 12 show a first preferred embodiment of the present invention. In this preferred embodiment, a variable capacitance switch is described as an example of a variable capacitance element.

Figure 1:
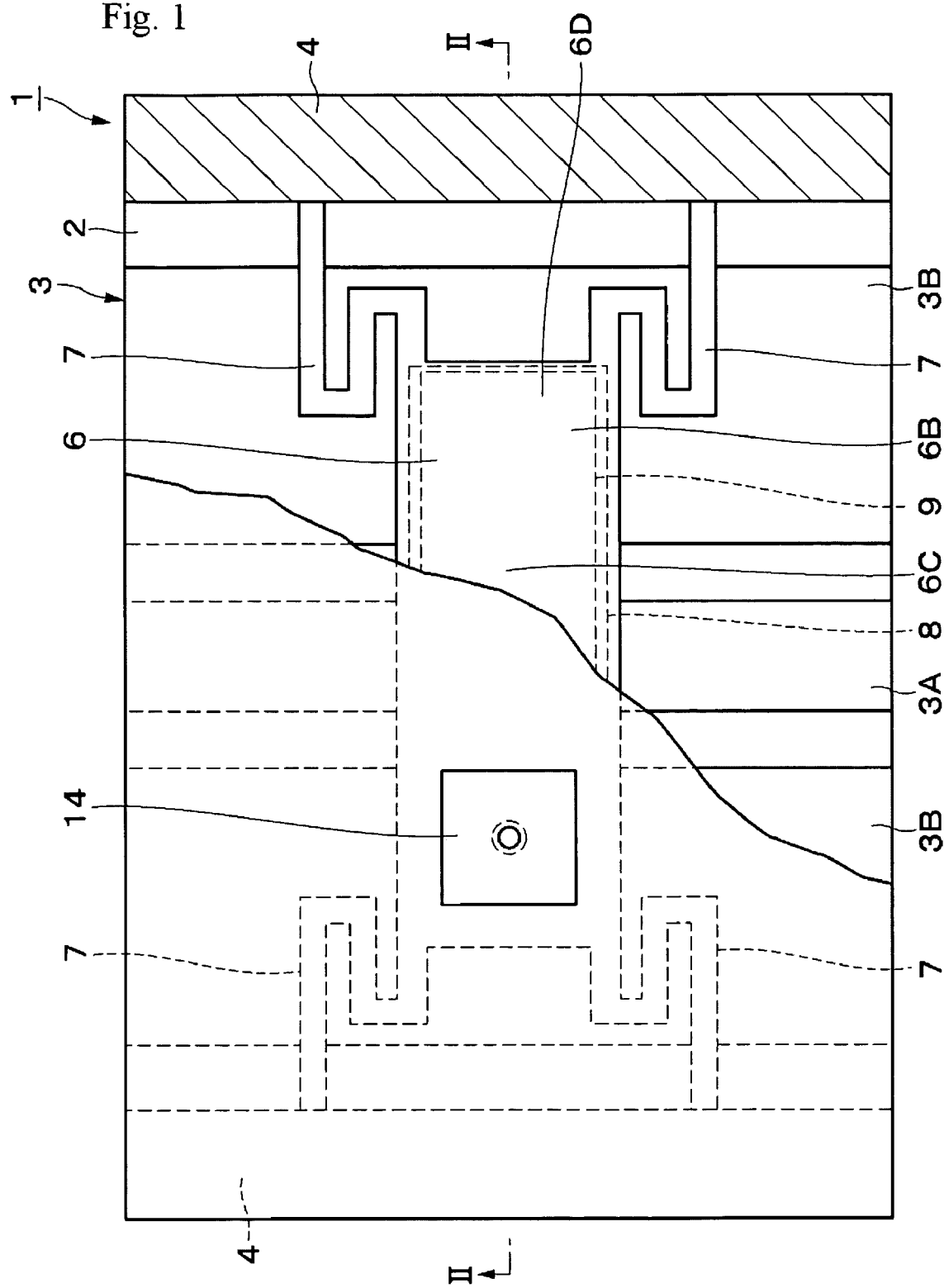
FIG. 1 is a plan view showing a variable capacitance switch according to a first preferred embodiment of the present invention, with a portion of the switch broken away.
Figure 2:
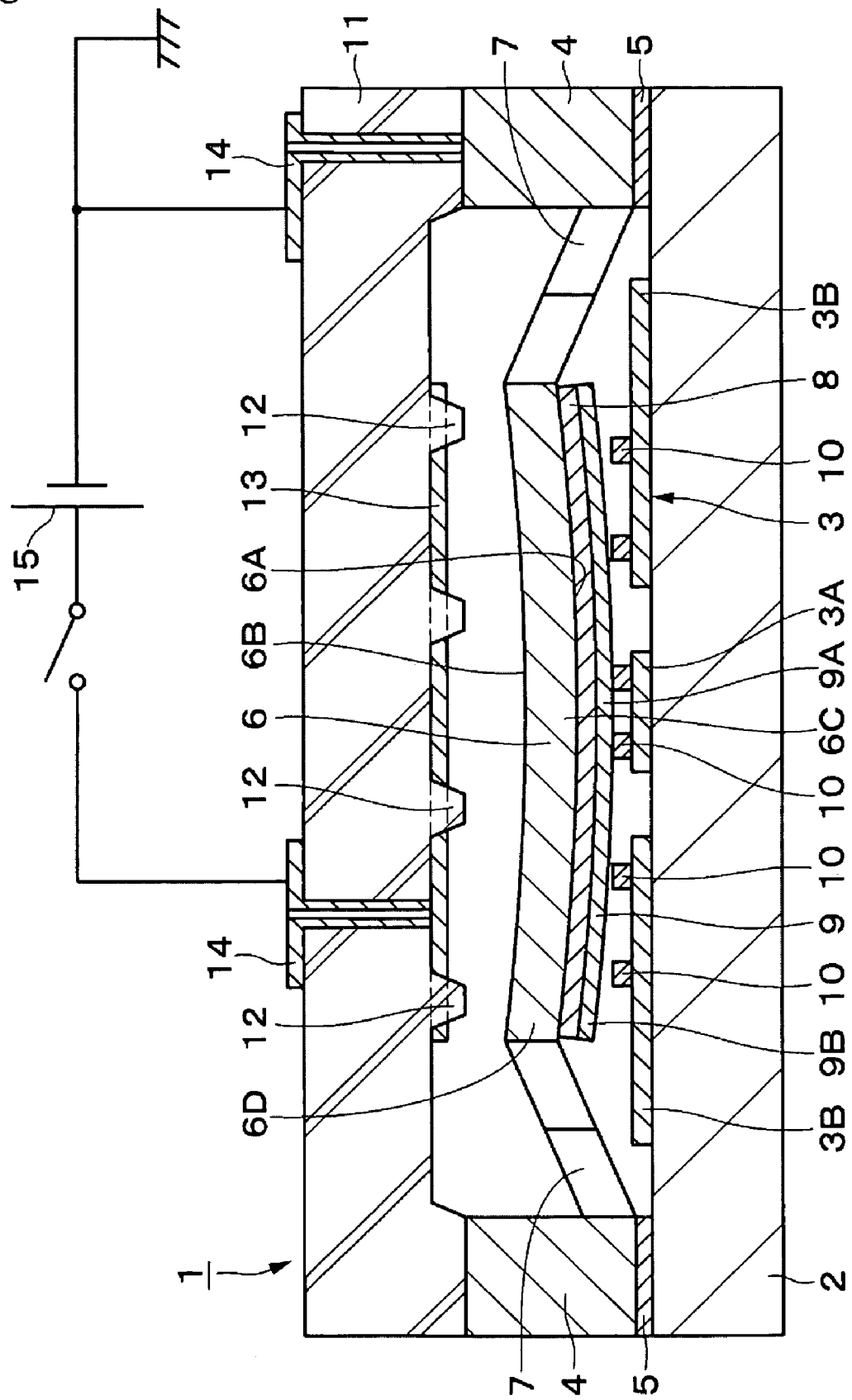
FIG. 2 is a sectional view of the variable capacitance switch when it is viewed in a direction from the line II—II shown in FIG. 1.

In the figures, reference numeral 1 denotes a variable capacitance switch, and reference numeral 2 denotes a substrate that defines a main portion of the variable capacitance switch 1. As shown in FIGS. 1 and 2, the substrate 2 is made of, for example, high resistive monocrystal silicon material, insulating glass material, or other suitable material.

Reference numeral 3 denotes a transmission line which is provided as a fixed electrode on the substrate 2. The transmission line 3 includes, for example, a plurality of metal films, and is arranged as a coplanar line for transmitting high frequency signals, such as microwaves and milliwaves. The transmission line 3 is preferably defined by a central conductor 3A which extends in the front and back directions in FIG. 1, and ground conductors 3B which are disposed to the left side and right side of the central conductor 3A, and which are connected to the ground.

Reference numeral 4 denotes, for example, two supporting portions which are provided on the substrate 2 in a protruding manner. To be more specific, the supporting portions are provided on the right side and the left side of the transmission line 3. Each supporting portion 4 is preferably made of, for example, low resistive monocrystal silicon material or other suitable material, and is formed by an etching process, or other suitable process, with a movable element 6 and support beams 7, which are described later. The supporting portion 4 is fixedly bonded to the substrate 2 by, for example, an adhesive 5, such as polyimide resin or other suitable material.

Reference numeral 6 denotes a movable element which is disposed above the upper surface of the substrate 2 so as to be displaced. The movable element 6 is preferably made of, for example, resistive monocrystal silicon material or other suitable materials, and is formed into an approximately quadrangle plate having, for example, a thickness of approximately 20 μm to approximately 80 μm.

In addition, the movable element 6 is supported above the substrate 2 by the support beams 7, which is described later, and opposes a longitudinal intermediate region of the transmission line 3. The movable element 6 is displaced in a direction (a direction in which the movable element 6 is moved close to or away from the transmission line 3) that is substantially perpendicular to the substrate 2. The movable element 6 is vertically moved between a signal cutoff position (see FIG. 2) at which a high frequency signal on the transmission line 3 is cut off or blocked by a movable electrode 9, which is described later, and a signal passage position (see FIG. 5) which allows the high frequency signal to pass through the longitudinal intermediate region of the transmission line 3.

A region of the movable element 6 which faces the conductors 3A and 3B of the transmission line 3 define a quadrangle conductor facing surface 6A. On the conductor facing surface 6A, an insulating film 8, which is described later, and the movable element 9 are stacked. A region of the movable element 6 which faces a cover element 11, which is described later, defines a back surface 6B.

A compressive stress of an insulating film 8, which is described later, acts on the movable element 6, whereby the insulating film 8 is constantly maintained in a state of warping in a direction (a direction in which it is downwardly convex in FIG. 2) in which it is convex toward the transmission line 3. This causes a central portion 6C of the movable element 6 to protrude by the dimension t in FIG. 3 as compared to a peripheral portion 6D around the central portion 6C.

Reference numeral 7 denotes, for example, four support beams which are each provided between each of four corners of the movable element 6 and each supporting portion 4. Each support beam 7 is preferably made of, for example, low resistive monocrystal silicon material or other suitable materials, and is bent to have a crank configuration, as shown in FIGS. 1 and 2. Each support beam 7 warps so as to be deformed in an upward-downward direction in FIG. 2 substantially perpendicular to the substrate 2, whereby the movable element 6 is supported so as to be displaced in the upward-downward direction.

When the movable element 6 is in the signal cutoff position, the support beam 7 is maintained in a warped (elastically deformed) state in a direction extending away from the transmission line 3. The resilience (spring force) of the support beam 7 causes the movable element 6 to apply a force on the transmission line 3. Therefore, when no power is supplied between a driving electrode 13, which is described later, and the movable element 6, the spring force of each support beam 7 maintains the movable electrode 9 at a position (signal cutoff position) abutting against a stopper 10, which is described later.

Figure 5:
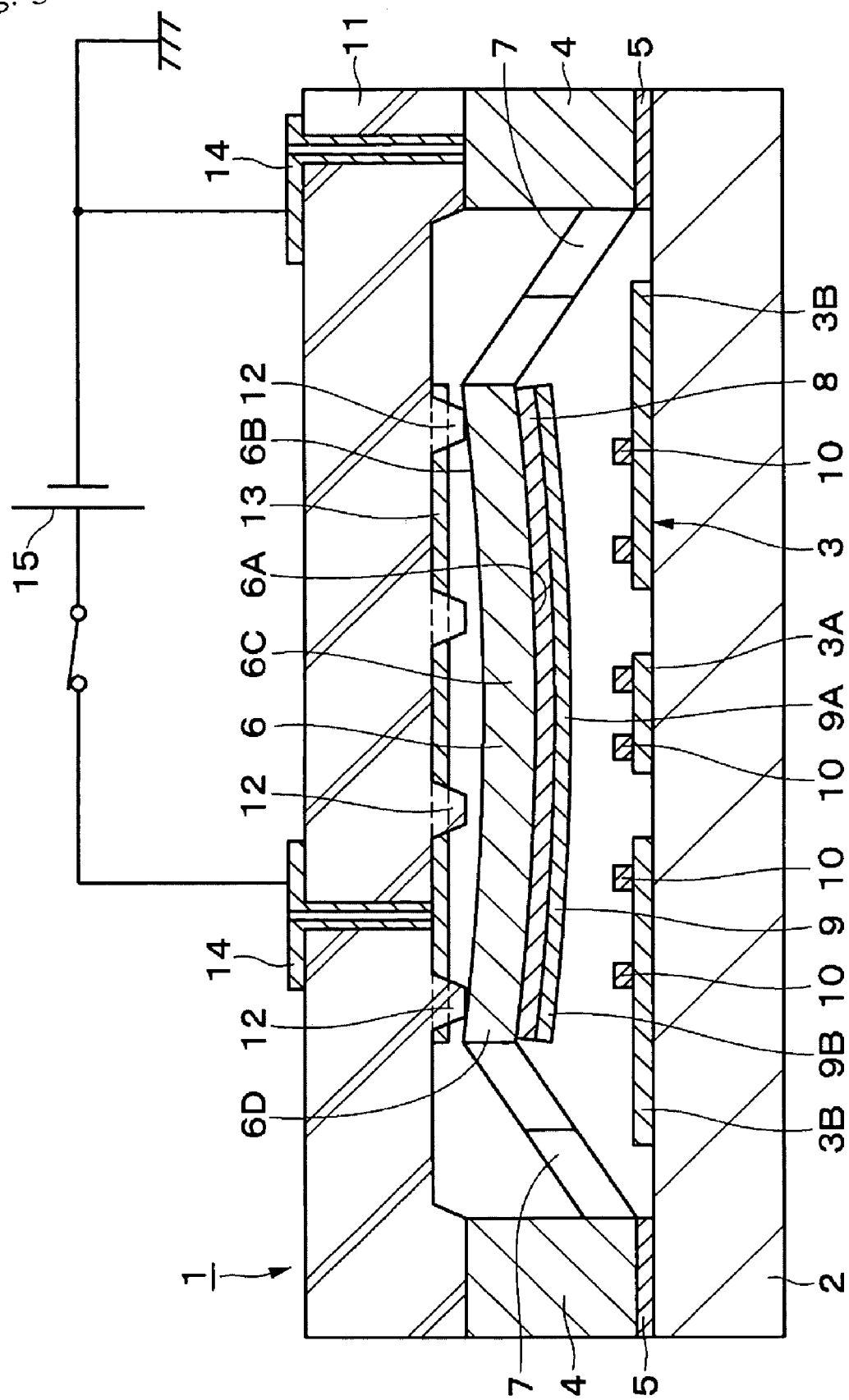
FIG. 5 is a sectional view showing a state in which a movable element is switched to be at a signal passage position.

Conversely, when power is supplied between the driving electrode 13 and the movable element 6, an electrostatic force is generated therebetween, as shown in FIG. 5. This displaces the movable element 6 and the movable electrode 9 in the direction extending away from the transmission line 3 against the spring force of each support beam 7, and maintained at a position (signal passage position) where the back surface 6B of the movable element 6 abuts against a stopper 12, which is described later.

Figure 3:
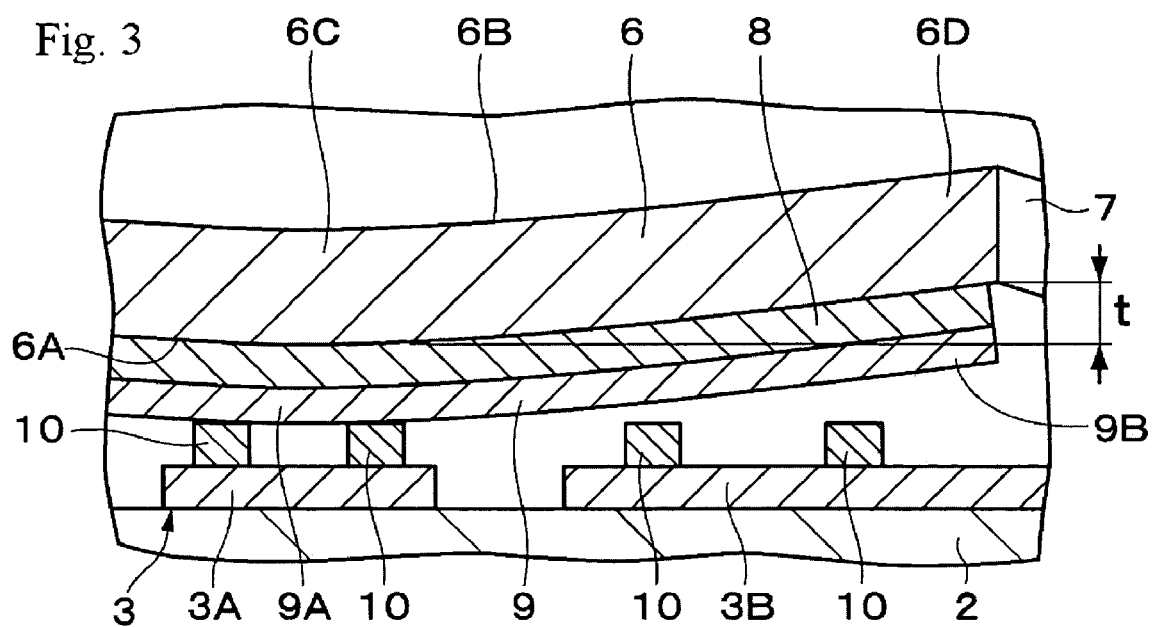
FIG. 3 is an enlarged sectional view showing main portions in FIG. 2, such as a movable element, an insulating film, and a movable electrode.
Figure 4:
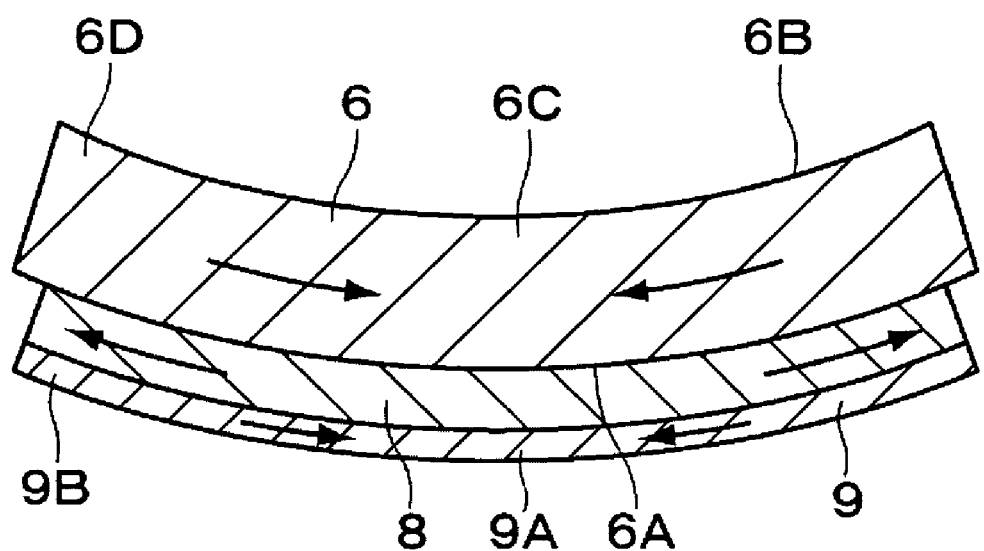
FIG. 4 is an illustration of a state in which a movable element, an insulating film and a movable electrode are warped.

Reference numeral 8 denotes an insulating film which is provided as a warp adjusting film on the conductor facing surface 6A of the movable element 6. As shown in FIGS. 2 to 4, the insulating film 8 is preferably defined by an insulating thin film made of, for example, silicon oxide ($SiO_2$) or other suitable material. The insulating film 8 is preferably arranged to cover substantially the entire conductor facing surface 6A of the movable element 6, having a thickness of, for example, approximately 0.1 μm to approximately 10 μm.

The insulating film 8 is disposed between the movable element 6 and the movable electrode 9, and provides insulation therebetween. In addition, by causing a compressive stress to act on the movable element 6, the insulating film 8 adjusts the direction of a warp occurring in the entire movable element 6, the insulating film 8, and the movable electrode 9. This maintains a state in which the movable element 6 and the movable electrode 9 are warped in a convex form toward the transmission line 3.

In this case, the movable element 6, the insulating film 8, and the movable electrode 9 are configured such that a contributing component of a thermal stress, generated by differences in thermal expansion among the movable element 6, the insulating film 8, and the movable electrode 9, is small for an internal stress generated when the insulating film 8 and the movable electrode 9 are disposed on the movable element 6. A total of the internal stress and the thermal stress is designed so as to maintain the warping direction of the movable element 6 in a single direction for a change in temperature.

This allows the variable capacitance switch 1 to stably maintain a state in which, for a change in temperature of, for example, approximately −50° C. to approximately 150° C., the movable element 6 warps in a downwardly convex shape toward the transmission line 3. This prevents the warping direction from changing.

Reference numeral 9 denotes a movable electrode provided on the conductor facing surface 6A with the insulating film 8 disposed therebetween. The movable electrode 9 is preferably defined by a three-layer thin metal film obtained by stacking, for example, an adhesion layer of titanium, chromium, or other suitable material, a barrier layer of platinum, palladium, or other suitable material, and an electrode layer of gold or other suitable material. The movable electrode 9 preferably has a thickness of, for example, approximately 0.1 μm to approximately 5 μm, and is arranged to cover the conductor facing surface 6A of the movable element 6.

The movable electrode 9 moves close to the intermediate portion of the transmission line 3 at the signal cutoff position and moves away from the transmission line 3 at the signal passage position, whereby the capacitance between the movable electrode 9 and the transmission line 3 is changed. This allows the resonant frequency of the transmission line 3 to change in accordance with the position of the movable electrode 9. A high frequency signal transmitted on the transmission line 3 is cut off at the position of the movable electrode 9 in accordance with the resonant frequency, or passes at this position. Thus, the movable electrode 9 performs a switching operation.

In this case, the compressive stress of the insulating film 8 maintains the movable electrode 9 so as to be warped in a convex form toward the transmission line 3, with the movable element 6. A central portion 9A of the movable electrode 9 projects toward the transmission line 3 more than peripheral portions 9B.

Accordingly, even if the ambient temperature changes, when the movable element 6 is at the signal cutoff position, the central portion 9A of the movable electrode 9 is stably maintained at a position close the central conductor 3A of the transmission line 3. As a result, at the signal cutoff position, the capacitance between the movable electrode 9 and the transmission line 3, the resonant frequency of the transmission line 3 can be accurately set, whereby the high frequency signal can be stably cut off.

Reference numeral 10 denotes insular stoppers provided at a plurality of positions of the transmission line 3. Each stopper 10 is formed by etching an insulating film of, for example, silicon oxide, and is formed at a portion of the surface of the transmission line 3, as shown in FIGS. 2 and 3. The stopper 10 projects upward from the surface of the transmission line 3 to the movable electrode 9. The projecting end of each stopper 10 abuts against the movable electrode 9 at the signal cutoff position. This enables the stopper 10 to maintain the movable element 6 and the movable electrode 9 to which force is applied by each support beam 7, at the signal cutoff position. In this state, the stopper 10 provides insulation between the transmission line 3 and the movable electrode 9.

Reference numeral 11 denotes the cover element, which is provided as another substrate in addition to the substrate 2, with each supporting portion 4 provided therebetween. The cover element 11 is made of, for example, insulating glass material, high resistive silicon material, or other suitable material. The cover element 11 is attached to one end of the supporting portion 4 by anode coupling, and is disposed opposite the substrate 2, with the movable element 6 provided therebetween.

Reference numerals 12 denotes insular stoppers integrally formed at a plurality of points of the cover element 11 at locations opposing the back surface 6B of the movable element 6. The stopper 12 projects at a position closer to the movable element 6 as compared to a driving electrode 13, which is described later. The projecting end of the stopper 12 abuts against the movable element 6 at the signal passage position. The stopper 12 maintains the movable element 6 and the movable electrode 9, which are biased toward the driving electrode 13, to be maintained at the signal passage position. The stopper 12 provides insulation between the movable element 6 and the driving electrode 13.

Reference numeral 13 denotes the driving electrode, which is provided as a driver on the cover element 11 by using, for example, a metal film or other suitable material. The driving electrode 13 is disposed between stoppers 12, and opposes the back surface 6B of the movable element 6. The driving electrode 13 is connected to a power supply 15 via a lead electrode 14 provided on the cover element 11. The power supply 15 is connected to the movable element 6 via another lead electrode 14, the supporting portions 4 and the support beams 7. When the power supply 15 supplies power between the driving electrode 13 and the movable element 6, an electrostatic force is generated therebetween, whereby the movable element 6 is displaced toward the signal passage position.

The variable capacitance switch 1 in this preferred embodiment has the above-described configuration. Next, an example in which the variable capacitance switch 1 is used as a shunt switch is described.

When the movable element 6 is at the signal cutoff position, by using the power supply 15 to supply power between the driving electrode 13 and the movable element 6, the movable element 6 is driven by an electrostatic force generated between them. The movable element 6 and the movable electrode 9 are displaced in a direction away from the transmission line 3, and are maintained at the signal passage position in contact with the stoppers 12.

This maintains the movable electrode 9 away from the transmission line 3, and the capacitance therebetween decreases. Thus, the impedances of opposing regions of both are sufficiently higher than the impedance (e.g., approximately 50 Ω) of the transmission line 3. Accordingly, the high frequency signal transmitted through the transmission line 3 passes at the position of the movable electrode 9, such that the variable capacitance switch 1 is in a closed (ON) state.

In addition, when power supply by the power supply 15 is stopped, the spring forces of the support beams 7 drive the movable element 6 to be close to the transmission line 3. This causes the movable electrode 9 to be maintained at the signal cutoff position in contact with the stoppers 10, and the movable electrode 9 is maintained in a state close to the transmission line 3. As a result, the resonant frequency of the transmission line 3 in the vicinity of the movable electrode 9 is changed to a predetermined frequency determined by the capacitance between the movable electrode 9 and the transmission line 3, and the inductance of the movable electrode 9.

By presetting the value of the resonant frequency to be equal to, for example, the frequency of the high frequency signal transmitted through the transmission line 3, the impedance of the transmission line 3 becomes the minimum value in the vicinity of the movable electrode 9, and the high frequency signal transmitted through the transmission line 3 can be cut off (reflected) at the position of the movable electrode 9. This switches the variable capacitance switch 1 to an open (OFF) state.

In this case, the compressive stress of the insulating film 8 causes the movable element 6, the insulating film 8, and the movable electrode 9 to warp in a convex form toward the transmission line 3. Accordingly, when the movable element 6 is switched to the signal cutoff position, the central portion 9A of the movable electrode 9 is stably maintained at an accurate position close to the central conductor 3A of the transmission line 3.

Therefore, when the movable element 6 is at the signal cutoff position, the capacitance can be accurately changed such that the capacitance between the movable electrode 9 and the transmission line 3 is a predetermined value. The resonant frequency of the transmission line 3 can be set with high accuracy in accordance with the value of the capacitance. As a result, the resonant frequency obtained when the movable element 6 is at the signal cutoff position and the frequency of the high frequency signal transmitted through the transmission line 3 can be set to coincide with each other. This ensures that a signal cutoff operation is accurately performed.

Next, a method for producing the variable capacitance switch 1 is described with reference to FIGS. 6 to 12.

Figure 6:
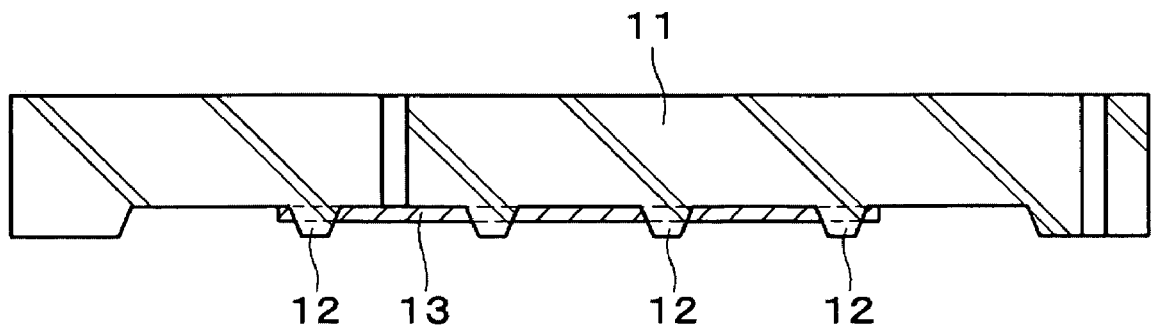
FIG. 6 is a sectional view showing a state in which driving electrodes and stoppers are disposed on a cover element at the time of producing a variable capacitance switch.

At first, in the cover-element forming step shown in FIG. 6, by processing, for example, an insulating glass plate, a high resistive silicon plate, or other suitable material, the cover element 11, on which the stoppers 12 and the driving electrode 13 are provided, is formed.

Figure 7:
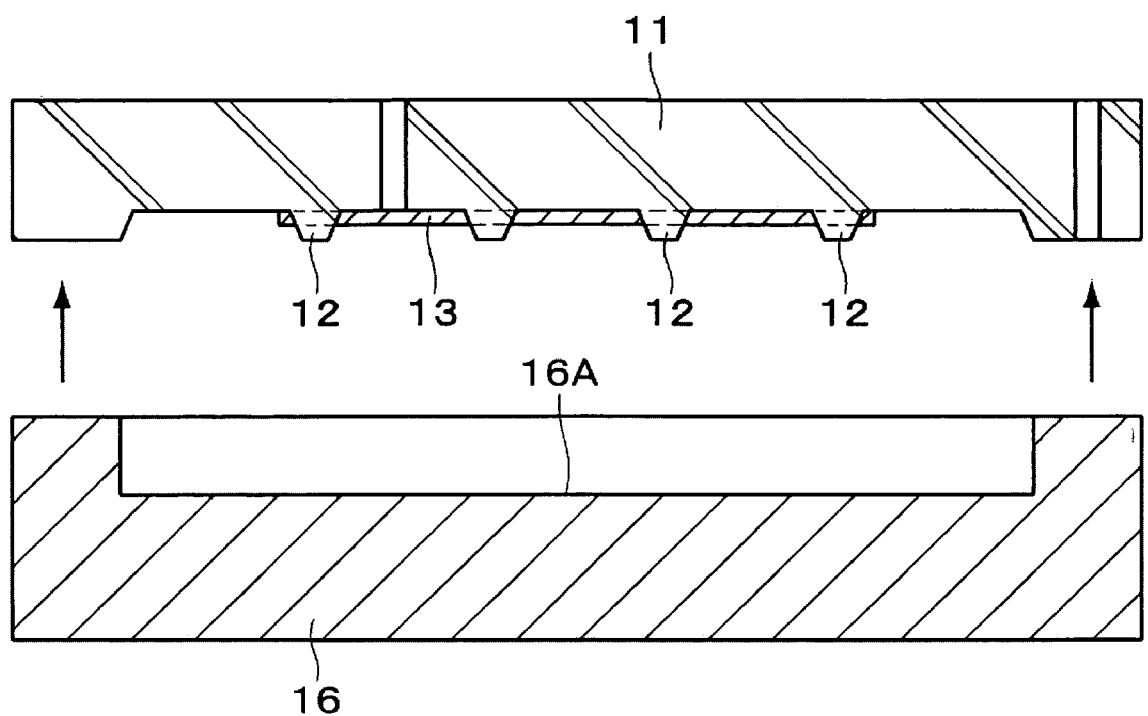
FIG. 7 is a sectional view showing a state in which the cover element and a silicon plate are joined to each other.
Figure 8:
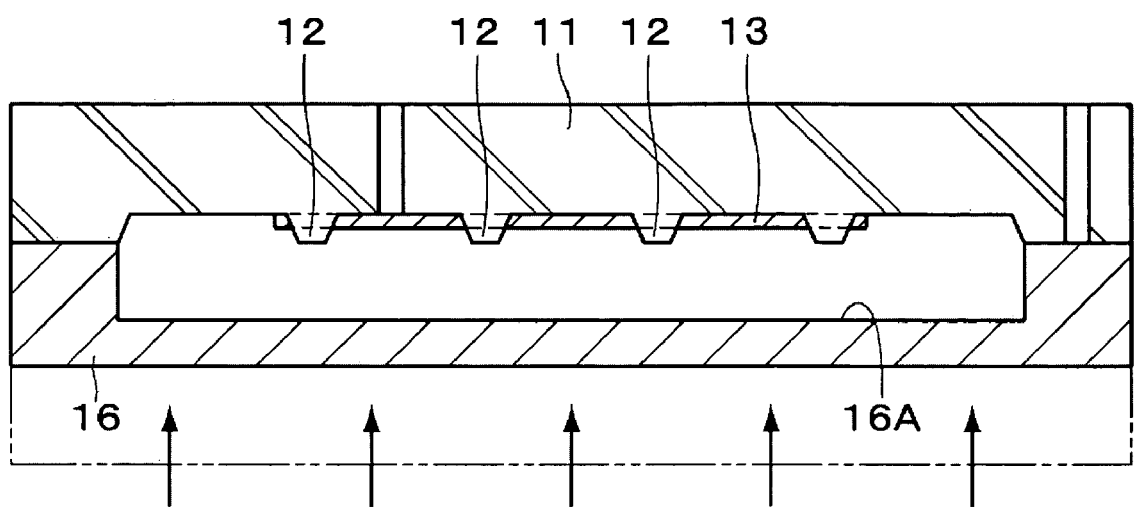
FIG. 8 is a sectional view showing a state in which the silicon plate joined to the cover element is polished.

In addition, in the silicon-plate joining step shown in FIG. 7, in a monocrystal silicon plate (or other suitable material) having a thickness of, for example, at least about 100 μm, a depression 16A having a predetermined depth is formed beforehand. The silicon plate 16 and the cover element 11 are joined to each other by anode coupling, or other suitable method. Next, in the polishing step shown in FIG. 8, by polishing the silicon plate 16 from the opposite side of the cover element 11, the silicon plate 16 is formed to have a thickness of approximately 20 μm to approximately 80 μm.

Figure 9:
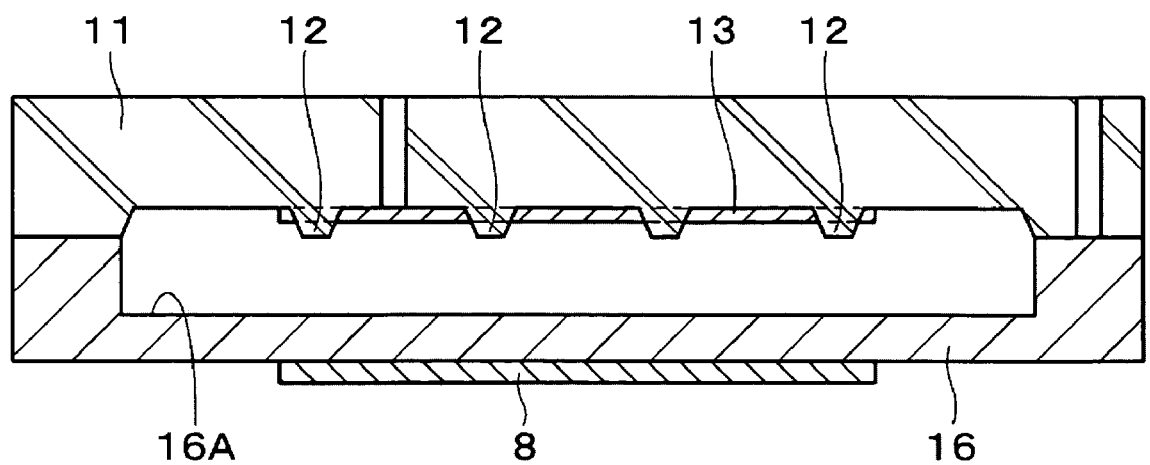
FIG. 9 is a sectional view showing a state in which an insulating film is formed on the polished silicon plate.

Next, in the insulating-film forming step shown in FIG. 9, by using, for example, sputtering or thermal oxidation to form a silicon oxide film on the polished surface of the silicon plate 16, and etching the film into a predetermined shape, the insulating film 8 is formed.

Figure 10:
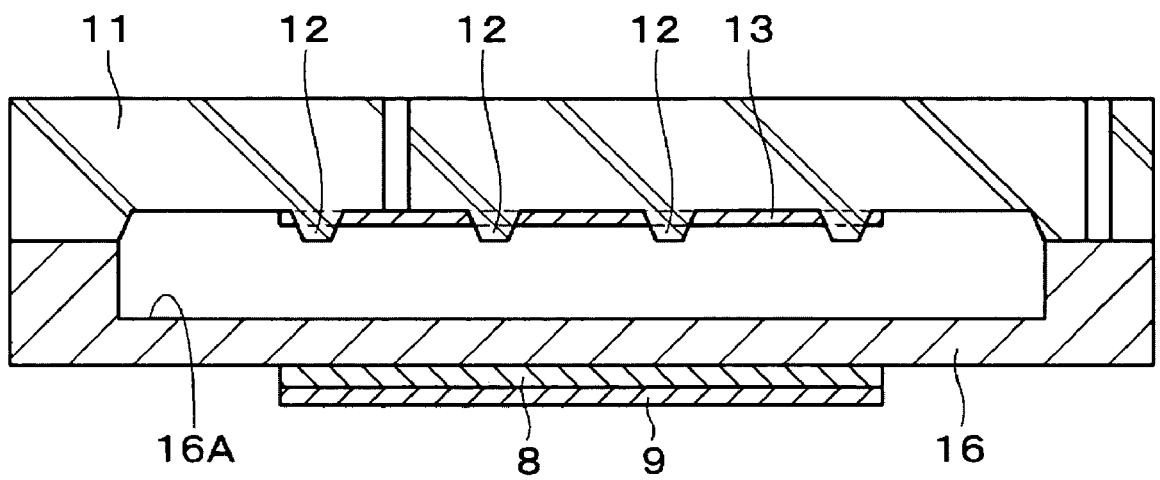
FIG. 10 is a sectional view showing a state in which a movable electrode is formed on the insulating film.

In the electrode forming step shown in FIG. 10, by using a method, such as deposition, to form a metal film including, for example, gold, platinum, palladium, titanium, chromium, or other suitable material, on the surface of the insulating film 8, and etching the metal film into a predetermined shape, the movable electrode 9 is formed.

In this case, in the insulating-film forming step and the electrode forming step, by appropriately setting, for example, the thicknesses of the insulating film 8 and the movable electrode 9, the compressive stress of the insulating film 8 cancels the tensile stress of the movable electrode 9, such that a total stress of the movable element 6, the insulating film 8, and the movable electrode 9 causes them to warp downwardly in a convex form.

Figure 11:
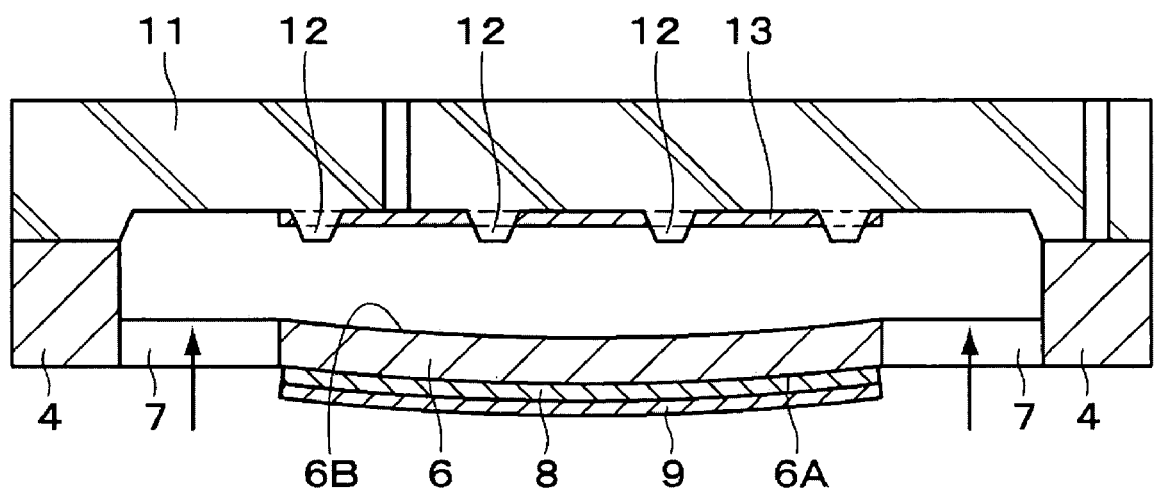
FIG. 11 is a sectional view showing a state in which a movable element is formed by etching the silicon plate.

Next, in the movable element forming step shown in FIG. 11, by performing etching, such as reactive ion etching, on the silicon plate 16, the silicon plate 16 is patterned into a desired shape. Its portions are used to form the supporting portions 4, the movable element 6, and the support beams 7. Accordingly, the compressive stress of the insulating film 8 causes the patterned movable element 6 to warp downwardly in a convex form.

Figure 12:
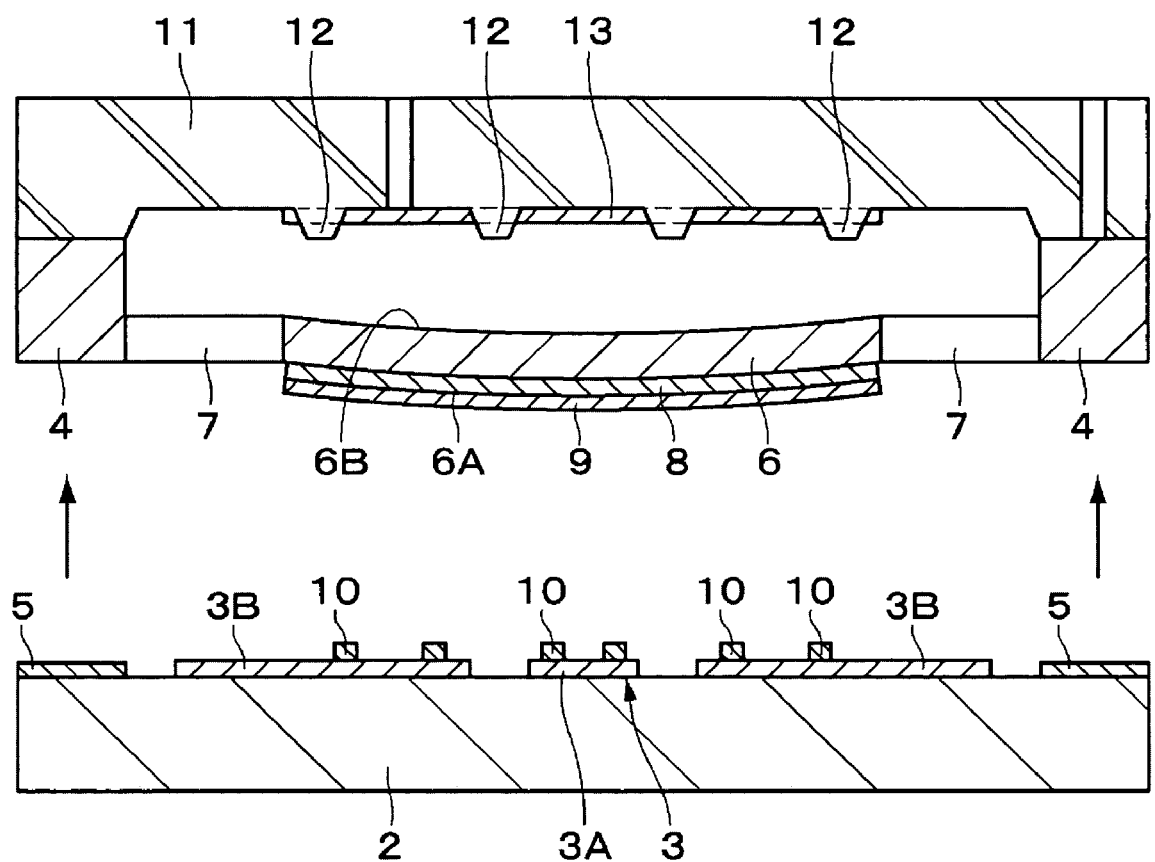
FIG. 12 is a sectional view showing a state in which a substrate is bonded to supporting portions in the movable element.

In the substrate bonding step shown in FIG. 12, by performing various types of film formation, etching, and other processes, on the surface of the substrate 2, the transmission line 3 and the stopper 10 are formed beforehand, and the substrate 2 is bonded to end surfaces of the supporting portions 4 using the adhesive 5. In the above-described steps, at an appropriate stage, by forming the lead electrode 14, the variable capacitance switch 1 is produced.

Therefore, according to this preferred embodiment, the insulating film 8 defines a warp adjusting film on the conductor facing surface 6A of the movable element 6. Thus, the insulating film 8 consistently warps the movable element 6 and the movable electrode 9 in a predetermined direction of warping in a downward convex form. When the movable element 6 is displaced to the vicinity of the transmission line 3, the movable electrode 9 is stably maintained at a predetermined position close to the central conductor 3A of the transmission line 3.

Accordingly, for example, when the movable element 6 is moved close to the transmission line 3 with an incline, the central portion 9A of the movable electrode 9 and the central conductor 3A of the transmission line 3 can be moved close together with accurate positional relationship. In addition, for example, even if the ambient temperature substantially changes, the insulating film 8 prevents the warping direction of the movable element 6 and the movable electrode 9 from being changed due to a difference in their thermal expansion, and prevents the positional relationship between the movable electrode 9 and the transmission line 3 from being shifted with the temperature change.

Therefore, a capacitance obtained when the movable electrode 9 and the transmission line 3 are moved close to each other is set to an accurate value, and the capacitance between the movable electrode 9 and the transmission line 3 can be switched with high accuracy in accordance with the position of the movable element 6. This makes it possible to perform a stable switching operation for the high frequency signal, and the operation characteristics are preferably maintained regardless of a change in temperature. In addition, the performance and reliability required for the switch is greatly improved.

In this case, the movable element 6 and the insulating film 8 are formed such that a total stress of an internal stress and a thermal stress consistently maintains the warping direction of the movable element 6 to be constant regardless of a change in temperature. Thus, it is ensured that, after the total stress, which is applied to the movable element 6 and the insulating film 8, is changed by an increase or decrease in temperature, the warping direction is prevented from being varied by this stress. This enables the movable element 6 and the movable electrode 9 to consistently warp in a stable state in a predetermined direction.

In addition, the insulating film 8 causes the movable element 6 and the movable electrode 9 to warp in a convex form toward the transmission line 3 using a compressive stress. Thus, the respective central portions 6C and 9A project closer to the transmission line 3 as compared to the respective peripheral portions 6D and 9B. Accordingly, when the movable element 6 is displaced toward the transmission line 3, the central portion 9A of the movable electrode 9 and the transmission line 3 are set to be closer to each other, such that the distance between both can be sufficiently decreased. Therefore, when the movable electrode 9 is moved close to or away from the transmission line 3, the capacitance between the movable electrode 9 and the transmission line 3 can be greatly changed, whereby the switching operation can be stably performed in response to a change in capacitance.

Since the movable electrode 9 is provided on the movable element 6, with the insulating film 8 provided therebetween, the insulating film 8 provides insulation between the movable element 6 and the movable electrode 9, in addition to adjusting the warping direction of them. This eliminates the need to provide another insulating structure between the movable element 6, which is supplied with power from the power supply 15, and the movable electrode 9. Thus, the construction thereof is simplified.

Since the transmission line 3 is provided with the stoppers 10, when the movable element 6 is displaced toward the transmission line 3, the movable electrode 9 abuts against the stoppers 10. This enables the stoppers 10 to stably maintain the movable electrode 9 at the signal cutoff position close to the transmission line 3, and the positional relationship (capacitance) between the movable electrode 9 and the transmission line 3 can be accurately set. In addition, the movable electrode 9 is prevented from being accidentally displaced due to vibration, a shock, or other external forces, such that a vibration resistant characteristic is enhanced. It is ensured that the stoppers 10 establish insulation between the movable electrode 9 and the transmission line 3, thus preventing short-circuiting therebetween.

In this case, the stoppers 10 are formed to be insular, and they are locally disposed on the surface of the transmission line 3. Thus, when the movable electrode 9 reaches the signal cutoff position, an area in which the movable electrode 9 and each stopper 10 abut against each other is reduced, whereby the variable capacitive switch 1 is prevented from malfunctioning caused by fixed bonding of the movable electrode 9 and each stopper 10.

In addition, in positions other than the stoppers 10, gaps are provided between the movable electrode 9 and the transmission line 3. For example, even if the movable electrode 9 or the transmission line 3 has, in the gap position, a projection caused by a processing error, the projection is prevented from affecting the positional relationship (the size of the gap between both) between the movable electrode 9 and the transmission line 3. Accordingly, the stoppers 10 compensate for processing errors of the movable electrode 9 and the transmission line 3, and the positional relationship between both is accurately and stably set.

For the substrate 2, the cover element 11 is provided opposite the substrate 2, with the movable element 6 provided therebetween, and the cover element 11 is provided with the stoppers 12, which are insular. Thus, similar to the stoppers 10, the stoppers 12 stably maintain the movable electrode 9 at the signal passage position, which is spaced away from the transmission line 3. In this state, it is ensured that insulation is provided between the movable element 6 and the driving electrode 13, and the movable element 6 is prevented from being fixedly bonded to the stoppers 12. Since, in this case, the stoppers 12 are integrally formed with the cover element 11, processing and formation thereof is efficiently performed.

Figure 13:
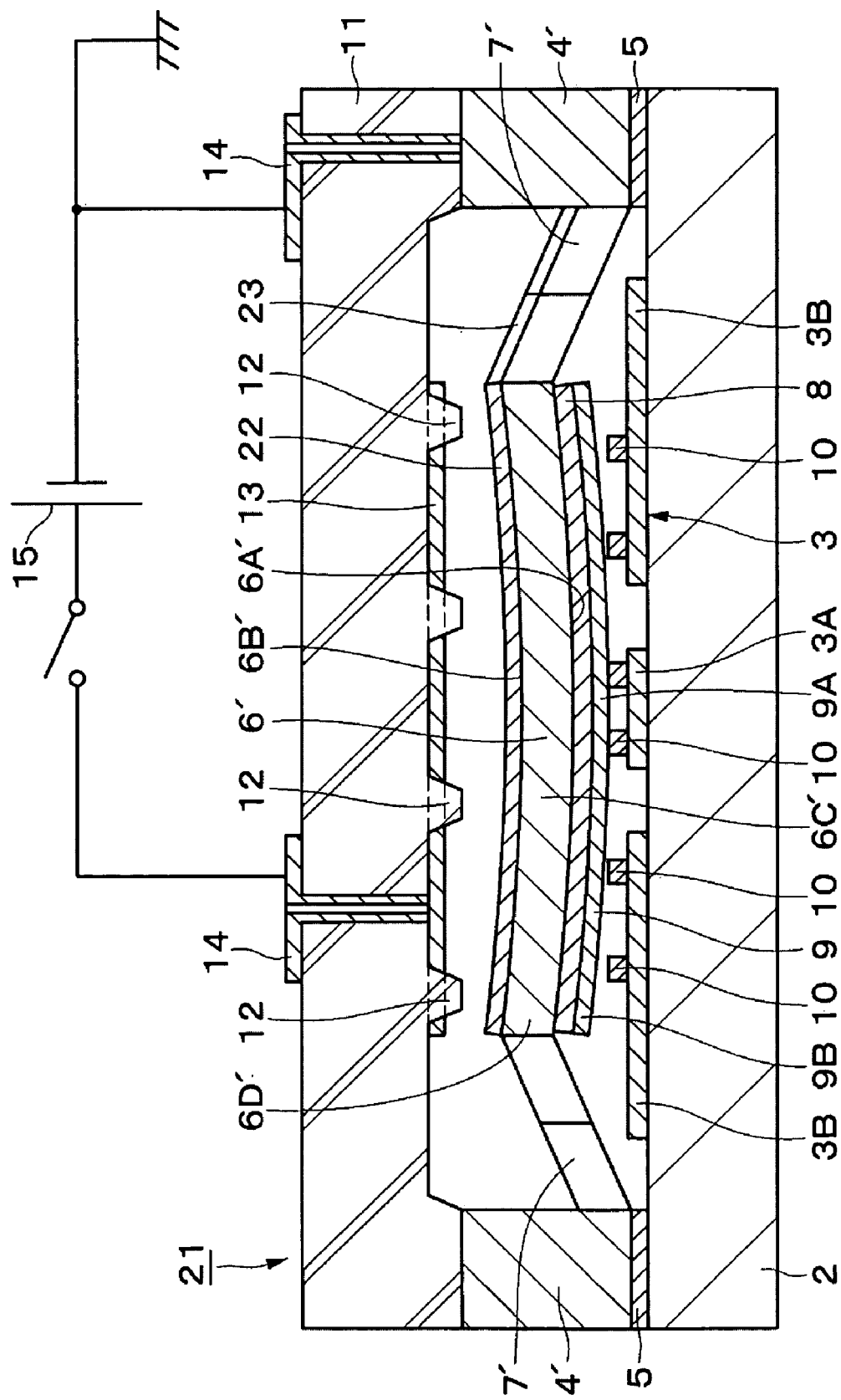
FIG. 13 is a sectional view showing a variable capacitance switch according to a second preferred embodiment of the present invention.

Next, FIG. 13 shows a second preferred embodiment of the present invention. This preferred embodiment includes a driving electrode that is provided on a movable element. In this preferred embodiment, the same reference numerals are used to denote identical components of the first preferred embodiment, and descriptions thereof are omitted.

Reference numeral 21 denotes a variable capacitance switch. The variable capacitance switch 21 includes, similar to the first preferred embodiment, a substrate 2, a transmission line 3, supporting portions 4', a movable element 6', support beams 7', an insulating film 8, a movable electrode 9, and a driving electrode 13. The movable element 6' includes a conductor facing surface 6A', a back surface 6B', a central portion 6C', and peripheral portions 6D'.

However, for example, a metal film or other suitable structure is used to provide a movable side driving electrode 22 on the back surface 6B' of the movable element 6'. The driving electrode 22 and a fixed side driving electrode 13 define a driver. The driving electrode 22 is also connected to a lead electrode 14 via a wiring pattern 23 (partially shown) provided along the supporting portions 4' and the support beams 7'.

When the variable capacitance switch 21 is switched, by using a power supply 15 to supply power between the driving electrodes 13 and 22 to generate an electrostatic force between them, the movable element 6' is displaced to the signal passage position.

Accordingly, also in this preferred embodiment, an operation and advantages substantially similar to those in the first preferred embodiment are obtained. In particular, in this preferred embodiment, the movable side driving electrode 22 is provided on the back surface 6B' of the movable element 6. Thus, when the variable capacitance switch 21 is switched, by supplying power between the fixed side driving electrode 13 and the movable side driving electrode 22, the movable element 6' is smoothly displaced to the signal passage position.

This eliminates the need to provide conductivity to, for example, the supporting portions 4', the movable element 6' and the support beams 7'. These members may also be formed using insulating materials, such that design freedom is enhanced.

Figure 14:
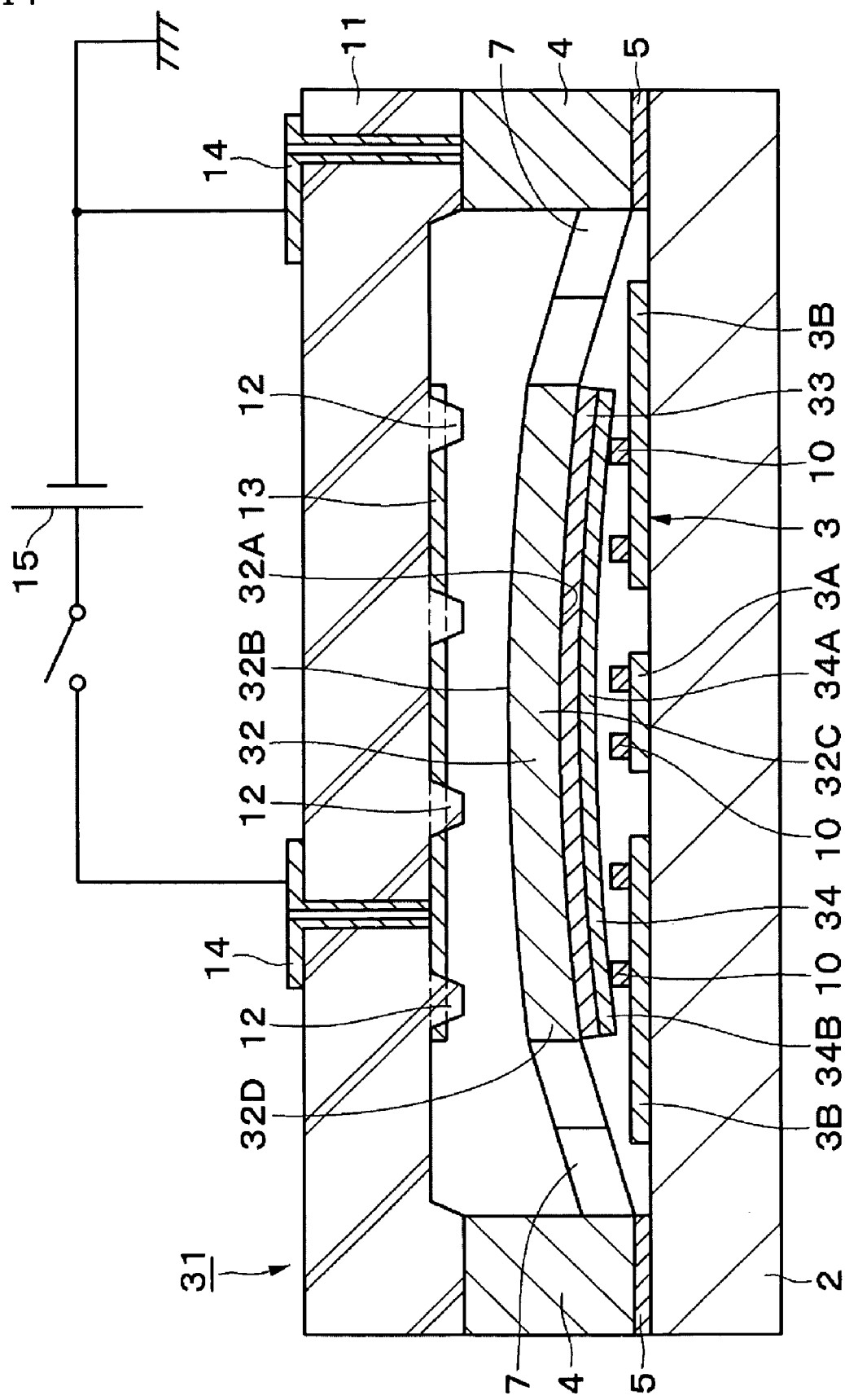
FIG. 14 is a sectional view showing a variable capacitance switch according to a third preferred embodiment of the present invention.

Next, FIG. 14 shows a third preferred embodiment of the present invention. This preferred embodiment includes a movable element set to warp in a concave form away from a fixed electrode. In this preferred embodiment, the same reference numerals are used to denote components identical to those in the first preferred embodiment, and descriptions thereof are omitted.

Reference numeral 31 denotes a variable capacitance switch. The variable capacitance switch 31 includes, similar to the first preferred embodiment, a substrate 2, a transmission line 3, support beams 7, a driving electrode 13, and a movable element 32, an insulating film 33 and a movable electrode 34 which are described later.

Reference numeral 32 denotes a movable element which is disposed on the surface of the substrate 2 so as to be displaced. The movable element 32 is preferably made of, for example, monocrystal silicon material or other suitable material, similar to the first preferred embodiment. The movable element 32 is preferably formed into a substantially quadrangular plate having a conductor facing surface 32A, a back surface 32B, a central portion 32C, and peripheral portions 32D, and is supported by the support beams 7 so as to be displaceable perpendicularly with respect to the substrate 2.

The insulating film 33 and the movable electrode 34, which are similar to those in the first preferred embodiment, are stacked on the conductor facing surface 32A of the movable element 32. However, both apply tensile stress to the movable element 32.

This consistently maintains the movable element 32 and the movable electrode 34 so as to warp in a direction (in a direction in which both are in an upward convex form in FIG. 14) in which they are in a concave form away from the transmission line 3. The central portions 32C and 34B of the movable element 32 and the movable electrode project upwardly as compared to the peripheral portions 32D and 34B.

Therefore, also in this preferred embodiment, an operation and advantages almost similar to those in the first preferred embodiment are obtained.

In the first and second preferred embodiments, the insulating films 8 are preferably provided on the conductor facing surfaces 6A and 6A' of the movable elements 6 and 6'. However, the present invention is not limited thereto. For example, it is possible that, by providing warp-adjusting films on the back surfaces 6B and 6B' of the movable elements 6 and 6', the movable elements be set to warp in a convex form toward the transmission line by the film's tensile stress.

In the preferred embodiments, the insulating films 8 and 33 which are preferably made of, for example, silicon oxide, are used as warp-adjusting films. However, the present invention is not limited thereto. For example, the warp-adjusting films may be made of other materials including silicon nitride (SiN). Moreover, when a warp-adjusting film is not used in the insulating structure between the movable element 6 and the movable electrode 9, the warp-adjusting film may be made of conductive material.

Figure 15:
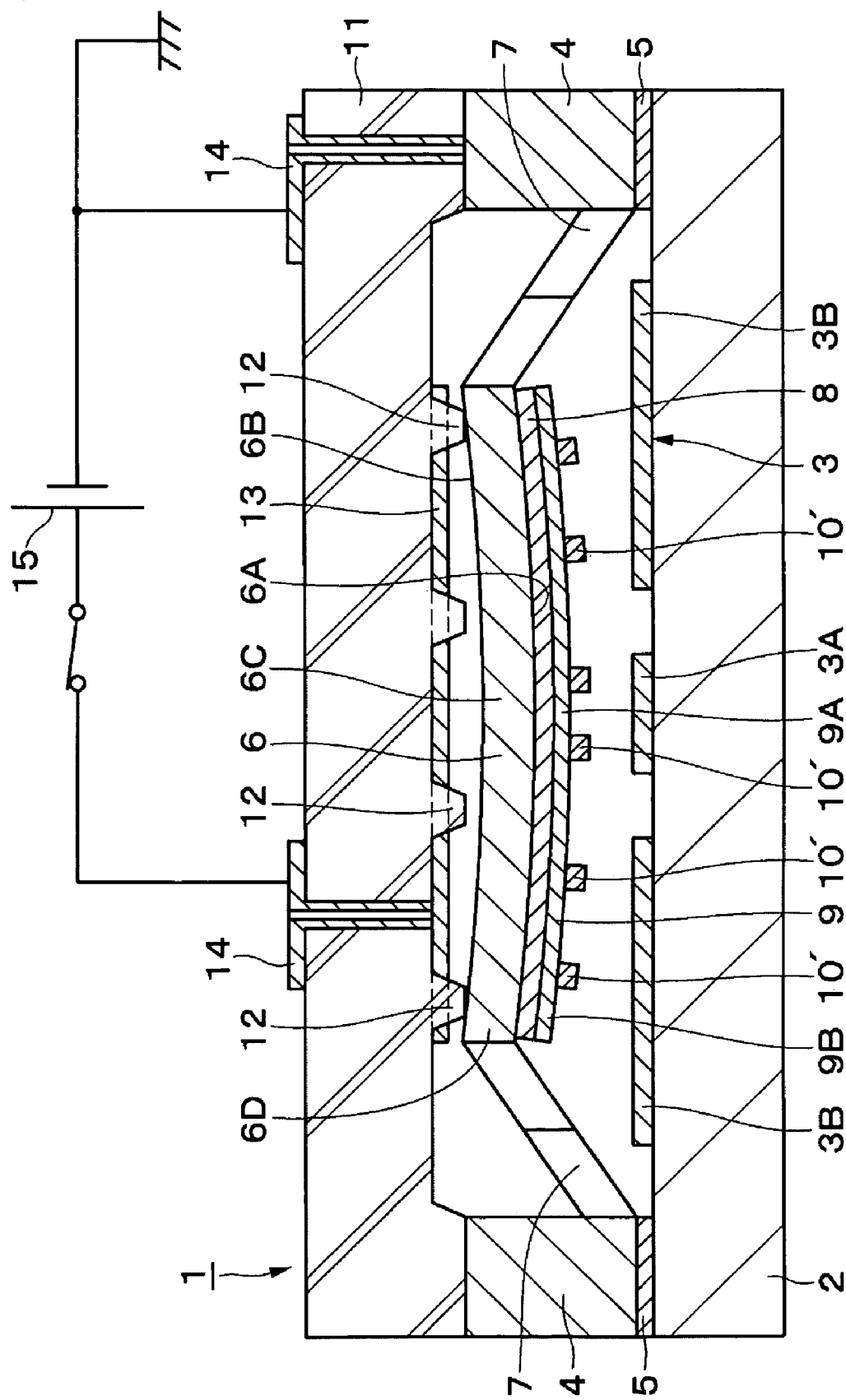
FIG. 15 is a sectional view, from a location similar to that of FIG. 5, of a variable capacitance switch according to a modification of a preferred embodiment of the present invention.

In the preferred embodiments, the stoppers 10 are provided on the transmission line 3 in a protruding manner. However, the present invention is not limited thereto. For example, the present invention may be modified as shown in FIG. 15. In this case, stoppers 10' are provided on the surface of the movable electrode 9 in a protruding manner, instead of the stoppers 10 on the side of the transmission line 3. In addition, in the present invention, both stoppers 10 and 10' may be provided.

In various preferred embodiments of the present invention, by etching an insulating film of silicon oxide or other suitable material, the stoppers 10, which are insular, are formed. However, the present invention is not limited thereto. For example, insulating material other than silicon oxide may be used. Alternatively, for example, an insulating film for covering the transmission line 3 may be formed and directly used without being etched.

In the preferred embodiments, the driving electrode 13 is preferably provided on the cover element 11. However, the present invention is not limited thereto. As shown in, for example, Japanese Unexamined Patent Application Publication No. 2000-188050, a driving electrode may be provided on a substrate and a cover element may not be used. In this case, the driving electrode opposes a movable element at a location that is different from the location of a fixed electrode, and an electrostatic force displaces the movable element.

In addition, in the preferred embodiments, variable capacitance switches 1, 21, and 31 have been described as examples of variable capacitance elements. However, the present invention is not limited thereto. For example, the present invention may be applied to a variable capacitor in which the capacitance of a capacitor including a fixed electrode and a movable electrode is switched in accordance with the position of a movable element.

In the preferred embodiments, a coplanar line is described as an example of the transmission line 3. However, the present invention is not limited thereto. For example, the present invention may be formed so as to be used with various types of transmission lines including a slot line.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

The invention claimed is:

1. A variable capacitance element comprising:
a substrate; a fixed electrode provided on the substrate;
a plate-like movable element provided on the substrate at a position opposing the fixed electrode so as to be displaced close to and away from the fixed electrode;
a movable electrode provided in a region of the movable element which faces the fixed electrode, the movable electrode having a capacitance in conjunction with the fixed electrode which is changed when the movable electrode is moved close to or away from the fixed electrode; and
a driver arranged to drive the movable element in a direction in which the movable element is moved close to or away from the fixed electrode; wherein
the movable element is provided with a warp adjusting film by which a direction in which a central portion of the movable element warps with respect to peripheral portions thereof is maintained in one of a direction of warping in a convex form toward the fixed electrode and a direction of warping in a concave form away from the fixed electrode.

2. The variable capacitance element according to claim 1, wherein, if a sum of an internal stress generated during formation of the warp adjusting film on the movable element and a thermal stress generated by a difference in thermal expansion between the movable element and the warp adjusting film defines a total stress, the movable element and the warp adjusting film are configured such that, for a change in temperature, the total stress maintains the warping direction of the movable element so as to be unidirectional.

3. The variable capacitance element according to claim 1, wherein the warp adjusting film is configured to warp the movable element in the direction of warping in the convex form toward the fixed electrode.

4. The variable capacitance element according to claim 1, wherein the warp adjusting film is an insulating film and is arranged to cover, with a compressive stress, a region of the movable element which faces the fixed electrode, the movable electrode is provided on the movable element with the insulating film provided therebetween, and the insulating film uses the compressive stress to warp the movable element and the movable electrode in the direction of warping in the convex form toward the fixed electrode.

5. The variable capacitance element according to claim 1, wherein the warp adjusting film is configured so as to warp the movable element in the direction of warping in the concave form away from the fixed electrode.

6. The variable capacitance element according to claim 1, wherein the fixed electrode is provided with an insulating stopper which abuts against the movable element when the movable element is displaced toward the fixed electrode.

7. The variable capacitance element according to claim 1, wherein the movable element is provided with an insulating stopper which abuts against the fixed electrode when the movable element is displaced toward the fixed electrode.

8. The variable capacitance element according to claim 6, wherein the stopper is provided in a portion of a region where the fixed electrode and the movable element oppose each other.

9. The variable capacitance element according to claim 7, wherein the stopper is provided in a portion of a region where the fixed electrode and the movable element oppose each other.

10. The variable capacitance element according to claim 1, wherein the fixed electrode is a transmission line arranged to transmit a high frequency signal.

11. The variable capacitance element according to claim 1, wherein a different substrate is provided opposite said substrate with the movable element provided therebetween, and the different substrate is provided with a driving electrode which defines the driver and uses an electrostatic force to displace the movable element.

12. The variable capacitance element according to claim 11, wherein the different substrate include at least one insulating stopper which abuts against the movable electrode when the movable element is displaced toward the different substrate.

13. The variable capacitance element according to claim 1, wherein said substrate includes at least one supporting portion disposed at an end of said substrate and arranged to support said movable element.

14. The variable capacitance element according to claim 13, wherein at least one support beam extends between said movable element and said at least one supporting portion so as to connect said movable element to said at least one supporting portion.

15. The variable capacitance element according to claim 1, wherein the warp adjusting film is made of silicon oxide.

16. The variable capacitance element according to claim 14, wherein said at least one support beam is made of a low resistive monocrystal silicon material.

17. The variable capacitance element according to claim 13, wherein said at least one supporting portion is made of a low resistive monocrystal silicon material.

18. The variable capacitance element according to claim 11, wherein the different substrate is attached to at least one supporting portion of said substrate by anode coupling.

19. The variable capacitance element according to claim 1, wherein the substrate is made of a high resistive monocrystal silicon material.

20. The variable capacitance element according to claim 1, wherein the substrate is made of an insulating glass material.

* * * * *